Feb. 17, 1970   H. G. WILK   3,495,840
MECHANICAL SEAL START-UP LUBRICATING ARRANGEMENT
Filed Jan. 22, 1968   2 Sheets-Sheet 1

INVENTOR
HAROLD G. WILK
BY *C. H. Stallings*
ATTORNEY

United States Patent Office 3,495,840
Patented Feb. 17, 1970

3,495,840
MECHANICAL SEAL START-UP LUBRICATING ARRANGEMENT
Harold G. Wilk, Los Angeles, Calif., assignor to Borg-Warner Corporation, Chicago, Ill., a corporation of Delaware
Filed Jan. 22, 1968, Ser. No. 699,577
Int. Cl. F16j 15/36, 15/34
U.S. Cl. 277—12
3 Claims

ABSTRACT OF THE DISCLOSURE

A lubricating and cooling system for a pressure vessel, such as a pump, wherein an auxiliary injection circuit is provided to lubricate the seal means prior to and upon starting the pump shaft rotating, said auxiliary injection circuit including pressure actuated control means operative to discontinue injection by the auxiliary injection circuit of lubricant upon the fluid pressure in the pump outlet reaching a predetermined value at which the regular lubricating means of the pump is effective to lubricate the seal.

CROSS-REFERENCES TO RELATED APPLICATIONS

Reference may be had to the application of Herbert E. Tracy, Ser. No. 469,700, filed in the United States Patent Office on July 6, 1965, for "Mechanical Seal Construction," now abandoned in favor of continuation application Ser. No. 791,859, filed Jan. 2, 1969, which application discloses a system for lubricating the seals of a pump having a mechanical seal of the type herein, together with an auxiliary injection system for injecting a lubricating fluid into the zone between the relatively rotating seal surfaces. Also, reference is made to the copending application of Winfred J. Wiese, U.S. Ser. No. 699,579 filed Jan. 22, 1968 entitled "Mechanical Seal Lubrication Means." The above applications, as well as this application, are assigned to the same assignee and thus have a common ownership.

BACKGROUND OF THE INVENTION

The invention disclosed herein has to do with the lubrication and cooling with fluid used for charging the pump, of a mechanical seal used for sealing a rotating shaft extending through a pressure vessel, wherein one seal element rotates with the shaft and a second seal element is held stationary, the two seal elements having contiguous faces, one of which is urged against the other and wherein one rotates relative to the other. Such arrangement is conducive to the development of extreme friction and heating between the relatively rotating seal faces, and, unless properly lubricated, the seal means will be seriously damaged or destroyed. Primarily, this invention is directed to assuring the proper lubrication, particularly under start-up conditions, for the device in which the seals are installed, to assure that the lubrication of the seal faces is adequate when the shaft of the pump or other pressure vessel starts to rotate. It is well known that excessive wear takes place at the seal faces during their first few rotations necessary to start the pump or other pressure vessel and bring it up to normal operating speed if the seals are not properly lubricated.

In this connection, other devices have been developed effective upon the starting of the motor to lubricate the seals. However, an arrangement continuing such lubrication while permitting the motor to be operated for an indefinite length of time without the shaft rotating has not been available. The present invention is intended to be started when the motor starts, but will continue to inject fluid to lubricate the seals until the pump pressure reaches a predetermined amount after the pump shaft has started rotating.

The principle of operation of mechanical seals of the type herein disclosed and also means for cooling and lubricating such seals during normal operation subsequent to start-up, are disclosed in various patents and are well-known in the art. See for example, H. E. Tracy U.S. Patent No. 2,824,759, issued Feb. 25, 1968, for "Liquid Cooled Seal"; H E. Tracy U.S. Patent No. 2,928,685, issued Mar. 15, 1960, for "Packing Means for High Pressure Mechanical Seals'; and H. E. Tracy U.S. Patent No. 3,015,506, issued Jan. 2, 1962, for "Multi-Step Mechanical Seal"

SUMMARY OF THE INVENTION

It is a purpose hereof to disclose an improved means and method of lubricating the seals for a pressure vessel having a rotating shaft therethrough such, for example, as the mechanical seals for the shaft of a centrifugal pump used for boiler feed, wherein the pump may be pumping very hot liquids under high pressure. It has been found that such mechanical seal means, which usually include two relatively rotating seals with complementary faces, are not adequately lubricated and conditioned for operation by the regular pump lubricating system if the pump is newly installed and first started up, or if the pump has been shut down for a period of time, such as for repair or for stand-by operation. Since it is a difficult, time-consuming and expensive procedure to replace the seal faces, the excessive wear and damage caused by friction when the faces are not properly lubricated is a serious problem. It is therefore an object of this invention to provide an improved auxiliary lubrication circuit which will provide lubricant directly to the seal faces prior to and during the start-up operation of the pump to eliminate relative rotation of the seals without proper lubricant. In this construction, it is an object of applicant to provide such auxiliary injection of lubricant to the seal faces until the normal pump pressure has been reached and the regular lubricating and cooling means has assumed the function of lubricating the seals.

It is a further object to provide an arrangement wherein it is possible to disconnect the motor from the pump shaft, or to delay initial connection of the pump shaft to the motor, and have the injection system automatically operable to cause lubricant to lubricate the seals by fluid in the pump, even though the pump shaft is not rotating.

It is a further object to provide a simple lubricating arrangement wherein a source of fluid pressure to the pump is channeled through the pump by an automatic valving means effective upon starting the motor, into the auxiliary injection circuit for lubricating the seal faces, but which auxiliary injection circuit is automatically discontinued when the pump pressure reaches a predetermined amount.

In this connection, it is an object of the invention to provide an arrangement wherein a pressure-sensitive switch, coupled with the outlet pressure of the pump, is electrically connected to the starter means for the pump motor, and wherein a pressure-actuated relay controlling a solenoid valve admitting fluid into the auxiliary injection system is likewise electrically connected to the motor starter. With such an arrangement, actuating the motor starter will start the motor and also open the solenoid valve, resulting in the injection of pump fluid into the seals for lubrication of the seal faces, the pressure for such fluid injection being obtained from a source of pressure, such as a condensate pump ordinarily used in charging the pump connected to the pump inlet, and also pressure developed in the pump when the regular pump shaft starts rotating and until the predetermined pump operating pressure is reached will be channeled through the auxiliary charging circuit. It is contemplated that the motor may or may not be operating the pump shaft upon the start of such auxiliary injection and its continuance until the pump is placed in operation by clutching the shaft to the motor.

Other objects and advantages of the invention will be hereinafter described or will become apparent to those skilled in the art, and the novel features of the invention will be defined in the appended claims.

DESCRIPTION OF THE PREFERRED EMBODIMENT

Figure 1:
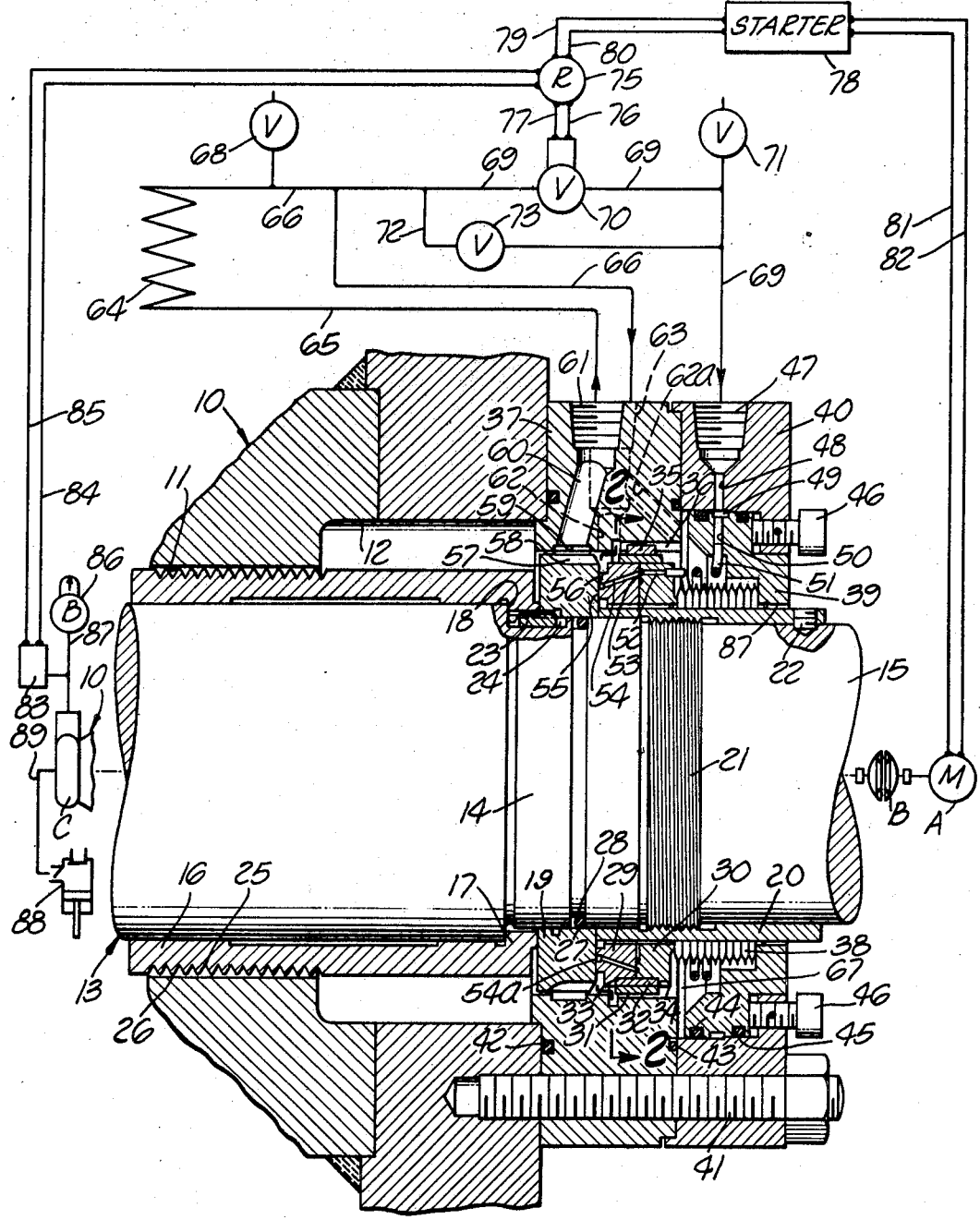
FIG. 1 is a fragmentary longitudinal sectional view showing a portion of a pump housing illustrative of a mechanical seal to which the invention is directed, and showing, schematically, associated equipment of the present invention.

Referring more in detail to the drawings, the reference numeral 10 designates generally a housing, such as a centrifugal pump housing, having a shaft opening extending therethrough, the opening including a restricted bore 11 and an enlarged bore forming a stuffing box chamber 12. A shaft 13 extends through the opening in the housing. A centrifugal pump impeller (shown schematically at C) may be mounted on the left-hand end of the shaft, as seen in FIG. 1, and a driver or prime mover, such as an electric motor A, is drivingly connnected to the right-hand end of the shaft 13 through a clutch means such as a fluid drive clutch B. The fluid drive or other clutch means B is preferably manually operable but may be controlled by automatic means, it only being necessary that it is effective to disconnect the motor A from the shaft 13 unless and until it is desired to start the shaft 13 rotating.

The shaft 13 has a reduced portion 14 and a portion 15 still further reduced in diameter. A sleeve 16 having an inturned flange 17 is mounted on the shaft 13, with the flange 17 in abutment with the shoulder 18 on the shaft. A rotary sealing ring 19 is mounted on the reduced shaft portion 14, with the inner face of the sealing ring in abutment with the flange 17 on the shaft sleeve 16. An internally threaded sleeve or nut 20 is threaded to the shaft by threads 21 and is screwed into engagement with the outer face of the sealing ring 19 to retain the latter in place by clamping it between the flange 17 and the retaining sleeve or nut 20. The retaining nut 20 is further secured to the shaft by means of a set screw 22. The shaft sleeve 16 and the rotary sealing ring 19 are prevented from rotating relative to the shaft by a key 23 received in a keyway 24 in the reduced portion 14 of the shaft 13 and in the complementary opposed keyways in the flange 17 of the shaft sleeve 16 and in the rotary sealing ring 19, as will be clear from the drawings. With this arrangement, the shaft 13, the sleeve 16, rotary sealing ring 19 and clamping nut 20 are locked together and rotate as a unit.

The shaft sleeve 16 is provided with a plurality of parallel circumferential grooves 25 forming the V-shaped ridges 26. The outer peripheries of these ridges 26 lie adjacent to the restricted bore 11 of the pump housing and form with the bore 11 a labyrinth seal that restricts or limits outward flow of fluid from the interior of the housing 10, through the clearance between the shaft sleeve 16 and the restricted bore 11 and into the enlarged bore or stuffing box 12. Thus, fluid from the pump chamber has a restricted flow path into the stuffing box or bore 12.

In a groove 28 in the reduced portion 14 of the shaft is an O-ring 27 for preventing flow of fluid outwardly along the shaft and between the rotary sealing ring 19 and the reduced portion 14 of the shaft.

The shaft 13 is journalled in suitable bearings (not shown), as is conventional.

A stationary or non-rotatable sealing ring 29 is arranged in sealing relation to the rotary sealing ring 19, and, as will be pointed out later, the rotary sealing ring 19 and the stationary sealing ring 29 have complementary or mating faces, preferably perpendicular to the shaft 13. The fixed or stationary sealing ring 29 is mounted upon a backing ring 30 by any convenient means, such as a mounting ring 31, that encircles both the stationary sealing ring 29 and the backing ring 30. The mounting ring 31 has one or more axially arranged keys 32 that are received in one or more slots 33 in the stationary sealing ring 29 and the aligned slot 34 in the backing ring 30. Preferably two keys and two sets of aligned slots are used in diametrically opposed relationship. Extending outwardly from the mounting ring 31 is at least one key 35 received in a keyway (or, if more than one, keyways) 36 in a flange 37. With this construction, the fixed or stationary sealing ring 29 is securely mounted upon the backing ring 30 by the mounting ring 31. The key 32 prevents relative rotation between the stationary sealing ring and its backing ring and the mounting ring. The key 35 prevents relative rotation of the entire stationary sealing ring assembly with respect to the flange 37.

It will be observed that the stationary sealing ring 29 and backing ring 30 have a limited axial movement with respect to the rotary sealing ring 19 and shaft 13, whereby the sealing ring 29 may be urged against the rotary sealing ring 19 or may be allowed to move axially away from the sealing ring 19 to reduce or eliminate engagement of the two rings 19 and 29.

One end of a (preferably metallic) bellows 38 is welded or otherwise attached to the outer face of the backing ring 30. The other end of the bellows 38 is attached, preferably by welding, to a bellows adapter 39. The bellows adapter is received within an auxiliary flange 40 which, in turn, is mounted upon the flange 37. Bolts, such as bolt 41, secure the flange 37 and the auxiliary flange 40 to the housing 10. Leakage between the housing 10 and the flange 37 is prevented by an O-ring 42, and leakage between the flange 37 and the auxiliary flange 40 is prevented by another O-ring 43. O-rings 44 and 45 prevent the loss of fluid between the auxiliary flange 40 and the bellows adapter 39.

The bellows adapter 39 is axially slidable in the auxiliary flange 40. Adjusting screws 46, 46 are employed to set the bellows adapter at a pre-selected axial position with respect to the shaft 13 for attaining the desired compression of the bellows 38, whereby the non-rotary sealing ring 29 may be preloaded with the desired force to urge it against the rotary sealing ring 19.

It is noted that fluid from the stuffing box created by the enlarged bore 12, will enter the space surrounding (radially outward of) the rotatable ring 19, the stationary ring 29, backing ring 30, and the bellows 38, providing a supply of liquid from the pump to be used in lubricating and cooling the rings and associated mechanisms. It is noted that the flange 37, auxiliary flange 40 and bellows adapter 39 have their internal circumferences spaced from the sleeve or nut 20 and shaft portion 15 whereby a cavity, which may be designated as the seal cavity 67, is formed. In turn, this seal cavity 67, as will be more fully apparent from further description herein, is separated by the seals and associated mechanism into two spaces, one space radially outwardly of the seals and associated mechanism and the other space radially inwardly of the seals and associated mechanism, the outer space being in fluid communication with the stuffing box 12 whereby fluid from the stuffing box fills said outer space; and the inner space, as will be later apparent, communicating to the atmosphere for drainage of any fluid that passes the seal faces or otherwise gets into the space radially inwardly of the seals and associated mechanism. Reference is made to H. E. Tracy U.S. Patent No. 2,824,759 dated Feb. 25, 1958; H. E. Tracy U.S. Patent No. 3,015,506 dated Jan. 2, 1962; and H. E. Tracy et al. U.S. Patent No. 3,291, 489 dated Dec. 13, 1966, as showing and describing generally the principle of operation of mechanical seals of the general type here illustrated.

In the present arrangement provision is made for direction cooling and lubricating fluid through a heat exchanger to the seal area for lubricating and cooling the opposed seal faces of the sealing rings 19 and 29, and associated parts such as seal backing ring 30, and bellows 38. Also, an additional provision is made for an auxiliary injecting system, in addition to the usual seal cooling and lubricating system, specifically for lubricating the seal faces of the sealing rings 19 and 29 before the pump's regulation cooling system takes over, the auxiliary system being operable only during the start up of the pump. In this connection, an improved arrangement for filling the system with fluid having means to assure that all, or practically all, entrapped air in the pump fluid system, heat exchanger and conduits is eliminated prior to relative rotation of the seals.

Figure 2:
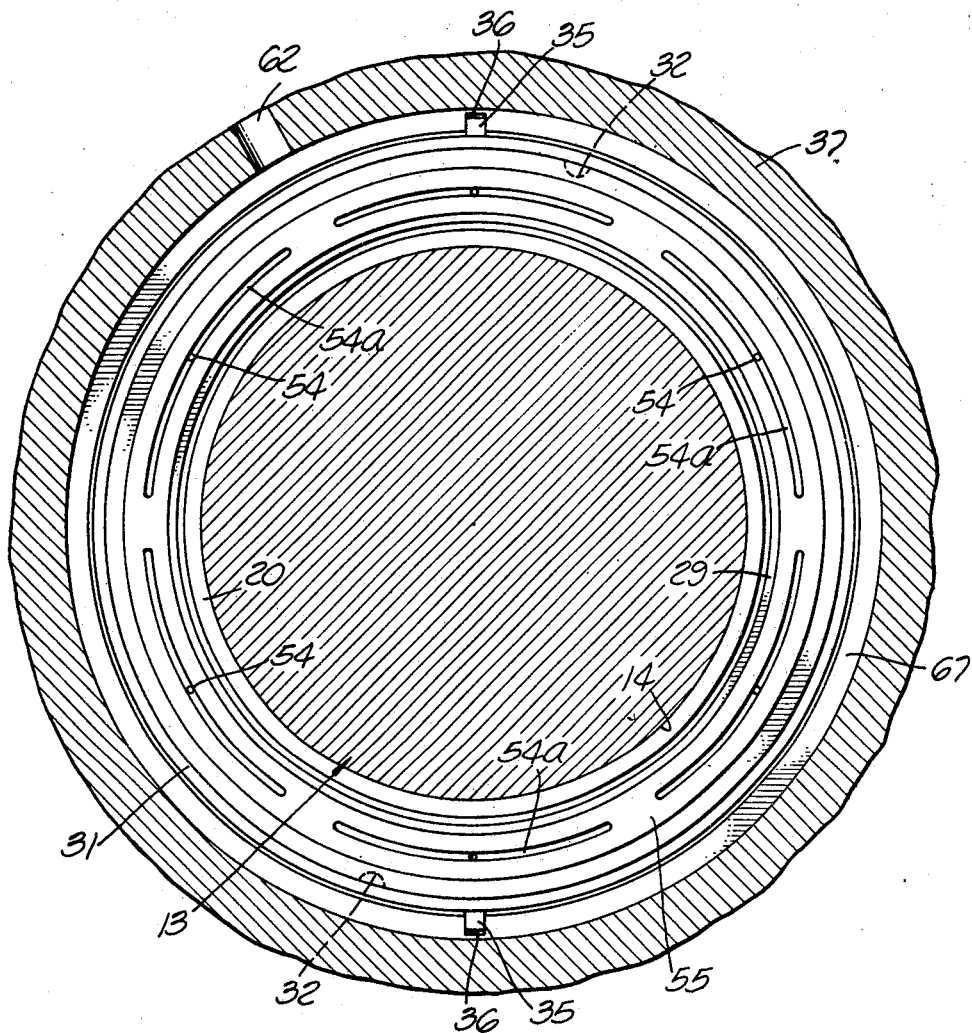
FIG. 2 is a fragmentary cross-sectional view, taken on the line 2—2 of FIG. 1, looking in the direction of the arrows.

As will be seen from FIG. 1, a tapped hole 47 is provided in the periphery of the auxiliary flange 40. Lubricating fluid from an auxiliary injection system (hereinafter described) is introduced through the tapped hole 47 and is conducted to the bottom of this hole through a bore 48 in the auxiliary flange 40, to an annular slot 49 on the outer periphery of the bellows adapter 39. Another bore 50 leads radially inwardly through the bellows adapter 39 from the slot 49 and is connected to one end of a continuous length of flexible tubing 51. The tubing 51 may be coiled about the bellows 38, and leads into an auxiliary bore 52 that extends through the backing ring 30 and opens into an annular slot 53 formed on the inner end of the backing ring 30. A plurality of longitudinal bores 54 extend through the stationary sealing ring 29, and each of these bores communicates at its inner end with an arcuate groove 54a (see FIG. 2) in the sealing face 55 of the stationary sealing ring 29. As will be most apparent from FIG. 2, six such bores 54 and arcuate grooves 54a are appropriate, although this number may be varied as desired. Thus, when lubricating fluid under pressure is admitted to the tapped hole 47, it will flow through the bore 48, the groove 49, the bore 50, the flexible tubing 51, and into the bore 52 in the backing ring 30, through the bore 52 into the annular groove 53 in the backing ring, and thence through the bores 54 into the arcuate grooves 54a. The lubricating fluid thus flows into the space between the sealing face 55 of the stationary sealing ring 29 and the sealing face 56 of the rotary sealing ring 19, tending to move the stationary sealing ring 29 axially away from the rotary sealing ring 19 and causing liquid to flow over the seal faces 55 and 56 to lubricate them. Thus it will be seen that the injection of fluid under pressure through the auxiliary injection means into the tapped hole 47 delivers fluid under pressure on to the relatively rotating faces 55 and 56 of the stationary and rotatable sealing rings 29 and 19, providing such faces with lubrication.

The rotary sealing ring 19 is, in effect, a pumping ring, and also is preferably constructed so as to form a thermal barrier to limit the amount of fluid (usually hot) from the stuffing box 12 that flows into the space around the sealing rings and associated mechanism. As shown here, the rotary sealing ring 19 is provided with a series of peripheral vanes 57, preferably formed with an open end on the side of the ring adjacent the face 56, and which vanes 57 do not extend entirely through the rotary sealing ring 19. Thus there is formed on the left-hand outer circumference of the rotary sealing ring 19 a periphery, or what may be designated a shoulder 58, which extends radially outward to a position closely adjacent the inner circumference of the flange 37, and which acts to deter flow of hot liquid from the stuffing box 12, thus serving as a thermal barrier between the stuffing box 12 and the seal cavity 67 and excluding from the seal cavity 67 all but a minute part of the hot liquid from stuffing box 12. Further, the rotation of the rotary seal ring 19 acts as a pump to force the fluid out of the seal cavity, and the barrier formed by the shoulder 58 confines the pumping action largely to the seal cavity.

The flange 37 is provided with an annular groove 59 on its inner periphery and aligned with the pumping vanes 57 (means serving as a barrier may be placed in the annular groove 59 to divert fluid therein through the outlet for the pumping means). A bore 60 extends generally radially outwardly from the annular groove 59 and communicates with a tapped hole 61 in the flange 37. Thus, fluid pumped by the pumping ring 19 is carried by the annular groove 59 into the bore 60 and out through the tapped hole 61.

Preferably aligned generally with the face areas 56 and 55 of the rings 19 and 29, respectively, is an inlet hole 62 opening at its bottom or radially inner end into the area above and adjacent to the mating or complementary seal faces 55 and 56, and at its outer end connecting to a tapped hole 63, whereby fluid entering the tapped hole 63 will be conducted through the inlet hole 62 and discharged on the outer surfaces of the seals in close proximity to their relatively rotating faces. As a matter of fact, the fluid is usually discharged on to the seal 29 adjacent its left-hand (as shown in the drawings) side, inasmuch as the pumping vanes 57 would tend to carry the cooled fluid back out through the bore 60 if the discharge were over the vanes 57. A branch inlet port 62a leads from the inlet hole 62 and discharges cooled lubricating liquid also into the right-hand (as shown in the drawings—FIG. 1) end of the seal cavity 67 in order to obtain better distribution of the cooling fluid so that it will cool the other components located in the seal cavity. This arrangement is conventional.

A heat exchanger 64, which may be of conventional form, is connected at its inlet end by means of the conduit 65, to the tapped hole 61, and is connected at its outlet end to the tapped hole 63 by means of a discharge conduit 66. Thus, fluid may be pumped by the pumping vanes 57 on the rotary sealing ring 19, through the bore 60, tapped hole 61, conduit 65, through the heat exchanger 64 and through the discharge conduit 66 into the tapped hole 63, inlet hole 2 (and branch inlet port 62a), and discharged on to the seals 19 and 29 and into the seal cavity 67 for cooling and lubricating the seals and cooling the seal cavity, the fluid having been cooled by the heat exchanger in its passage therethrough. This circuit of fluid through the heat exchanger is more or less conventional and would normally be operative whenever the pump was running.

The discharge conduit 66 has a vent valve 68 therein, or connected thereto, preferably in close association with the outlet end of the heat exchanger 64. The purpose for this vent valve will be described hereafter. Also connected to the discharge conduit 66 is a branch conduit 69 in which is located a valve, preferably a solenoid valve, 70, and a second vent valve 71, and which branch conduit 69 discharges into the tapped hole 47. A bypass conduit 72 is connected to the branch conduit 69 between the solenoid valve 70 and the discharge conduit 66, and is adapted, when open, to conduct fluid around the solenoid valve 70 and back into the branch conduit 69. A valve 73, preferably a manual valve, is in the bypass conduit 72 and is operable to open and close said bypass conduit to the flow of fluid.

The solenoid valve 70 is opened by a relay 75 which is connected thereto through electrical wires 76 and 77 and which relay, in turn, is connected to a starter switch 78 by means of the electrical connectors 79 and 80. It may be pointed out that, as contemplated herein, the relay 75 is of a type subject to control by a pressure switch for the purpose of allowing it to open the valve 70 or close the valve 70 when energized by the starter 78, such relay 75 being readily available on the commercial market and, as such, not requiring any description herein. The starter 78 is connected to the motor A by means of electrical conduits 81 and 82. A source of current (not shown) to operate the motor and other mechanisms is supplied to the starter in the well known manner, whereby actuation of the starter will energize the motor A and the relay 75.

The relay 75 is also connected to a pressure-sensitive switch, herein termed a pressure switch, 83, by means of the electrical connectors 84 and 85. This pressure switch, which is a commercial device readily obtainable on the open market, is normally closed when the pressure in the fluid system is not sufficient to open it, whereby the relay 75 is conditioned for actuation to open the valve 70 when the starter is energized. As will be noted from FIG. 1, the pump impeller C is connected from its outlet to a boiler, or other device into which it pumps, 86, by means of the fluid line 87. The pressure switch 83 is connected into the pump outlet or fluid line 87 whereby pressure existing in the fluid line operates the switch 83.

The pump inlet is provided with a source of fluid having some pressure, here indicated as the condensate pump 88, which has an outlet conduit 89 leading into the pump inlet in the well known manner. Thus, the condensate pump may be used for pressurizing and filling the pump and hydraulic system with fluid, even though the pump impeller C is not operating. Such fluid will not normally be of a pressure magnitude to open the switch 83 and cause the valve 70 to close, it being necessary that the impeller C build up the predetermined operating pressure to open the switch 83 and cause the relay 75 to allow the valve 70 to close. With boiler feed pumps of the type with which this system is adapted to operate, a pressure of perhaps a thousand pounds per square inch would be necessary to open the pressure switch 83 and close the valve 70.

OPERATION

When the pump is installed and connected into the pumping system, the inlet of the pump impeller C is connected to a source of fluid under pressure such, for example, as a condensate pump 88, which furnishes fluid to be pumped at an increased pressure. The operator will then open the valve 68 and allow fluid to flow into the pump chambers, including the stuffing box 12, and around the outside of the seals, bellows, etc. in the pump cavity 67. When these have been filled, the fluid will continue to flow through the conduits 65 and 66 and fill the heat exchanger 64, forcing any entrapped air out through the vent valve 68. The vent valve 68 is then closed, and the bypass valve 73 and vent valve 71 are opened so that the fluid will flow through these conduits and into the conduit 69, tapped hole 47, bore 48, annular slot 49, bore 50, flexible tubing 51, auxiliary bore 52, slot 53, longitudinal bore 54, and into the arcuate groove 54a on to the sealing faces 55 and 56. This fluid will force any entrapped air in the auxiliary charging system out through the valve 71.

The valve 71 may then be closed and, until the operator is ready to operate the system, some leakage of lubricating fluid across the faces 55 and 56 will take place. Such leakage is exhausted from the seal cavity portion radially inward of the seal 29, backing ring 30 and bellows 38 to atmosphere between the bellows adapter 39 and nut 20. However, before the system is operative, the valve 73 and the bypass conduit 72 are closed. The motor A will normally be started with the fluid drive clutch B disconnected. Upon actuation of the starter switch 78, the motor A will start to rotate and the relay 75 will cause the solenoid valve 70 to open, which, in turn, causes fluid from the heat exchanger 64 to flow through the conduit 69 and associated conduits onto the faces 55 and 56 of the seal rings 29 and 19, respectively, lubricating and conditioning those faces. As long as the motor A continues to operate prior to the shaft reaching its normal operating speed, the solenoid valve 70 will remain open. However, when the fluid drive clutch B is operated to connect the motor A to the shaft 13, the pressure in the pump will start to build up. When this occurs, and the pressure has reached a predetermined value wherein it would normally lubricate the seal faces 55 and 56 without assistance from the auxiliary charging circuit, a pressure-sensitive switch 83 will be actuated and the relay 75 will allow the valve 70 to close, thus isolating the auxiliary charging circuit from the lubrication system.

With this arrangement, regardless of the time the motor A is operated, the seal faces 55 and 56 will be lubricated so that the start of rotation of the shaft 13 will not cause excessive wear on the seal faces 55 and 56.

While the specific details of an illustrative embodiment of the invention have been herein shown and described, changes and alterations may be made without departing from the spirit of the invention.

I claim:
1. In combination with a pump adapted to contain fluid under pressure to be pumped and having a rotatable shaft, seal means to prevent leakage around said shaft, said seal means including a rotary sealing ring carried by said shaft, said sealing ring having a sealing face in relatively rotatable sealing relationship with another sealing face on a non-rotary sealing ring surrounding said shaft, a prime mover for said shaft, and means for actuating said prime mover, those improvements comprising:
 (a) a fluid injection circuit extending from the fluid under pressure in said pump to said seal means, said fluid injection circuit passing through said non-rotary sealing ring and terminating in a discharge opening in the sealing face thereof, for injecting fluid into the space between said sealing faces intermediate their radially inner and radially outer boundaries to lubricate said faces;
 (b) means operable by the means for actuating said prime mover to admit fluid from said fluid injection circuit into said space between said sealing faces; and
 (c) pressure-actuated means automatically operable to close said fluid injection circuit whereby fluid from said pump through said fluid injection circuit will be discontinued after a predetermined pressure has been attained in said pump.

2. In combination with a pump as claimed in claim 1, wherein a valve is provided in said fluid injection circuit and operable by said means for actuating said prime mover to admit fluid from said fluid injection circuit into said space between said sealing faces.

3. In combination with a pump as claimed in claim 2, wherein said pressure-actuated means includes a pressure switch actuated by fluid pressure in said pump to close said valve after a predetermined pressure has been attained in said pump.

References Cited

UNITED STATES PATENTS 2,824,759  2/1958  Tracy _____ 277—15
2,834,619  5/1958  McNab _____ 277—28
2,631,050  3/1953  Haeberlein _____ 277—12

SAMUEL ROTHBERG, Primary Examiner

U.S. Cl. X.R.

103—111; 184—6; 277—15, 28